US 8,006,837 B2

(12) United States Patent
Ross

(10) Patent No.: US 8,006,837 B2
(45) Date of Patent: Aug. 30, 2011

(54) LONG BOX PACKAGING DESIGN FOR PRERECORDED MEDIA

(75) Inventor: Edward C. Ross, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1748 days.

(21) Appl. No.: 11/156,239

(22) Filed: Jun. 17, 2005

(65) Prior Publication Data

US 2006/0283736 A1 Dec. 21, 2006

(51) Int. Cl.
*B65D 85/57* (2006.01)
(52) U.S. Cl. .................. 206/307; 206/308.1; 206/769
(58) Field of Classification Search .................. 206/312, 206/775–781, 308.1, 763, 769–771, 307, 206/495, 387.11, 313; 229/121
See application file for complete search history.

(56) References Cited

U.S. PATENT DOCUMENTS

| | | | |
|---|---|---|---|
| 3,656,612 A * | 4/1972 | Sellors | 206/782 |
| 3,675,763 A * | 7/1972 | Sandel | 206/387.11 |
| 4,438,846 A * | 3/1984 | Stylianou | 206/387.11 |
| 4,957,202 A * | 9/1990 | Yoshiki et al. | 206/734 |
| 4,986,419 A * | 1/1991 | Collett et al. | 206/387.1 |
| 6,823,988 B2 * | 11/2004 | Ryan et al. | 206/216 |

* cited by examiner

*Primary Examiner* — Steven A. Reynolds
(74) *Attorney, Agent, or Firm* — Walter W. Duft

(57) ABSTRACT

An improved long box package for prerecorded media includes an elongated substantially rectangular box enclosure having a front wall, a rear wall, and a pair of first and second side walls. The box enclosure further includes an open top end, a bottom end adapted to be closed, and an interior shelf disposed between the top end and the bottom end for supporting the bottom end of a media case to be carried by the package. An opening is formed in the front wall that is contiguous with the open top end and which extends toward the shelf. In combination, the open top end and the contiguous front wall opening define an open channel for receiving the media case. The open channel facilitates rapid placement of the media case in the package by virtue of the media case not being restricted to insertion through the top end only.

18 Claims, 1 Drawing Sheet

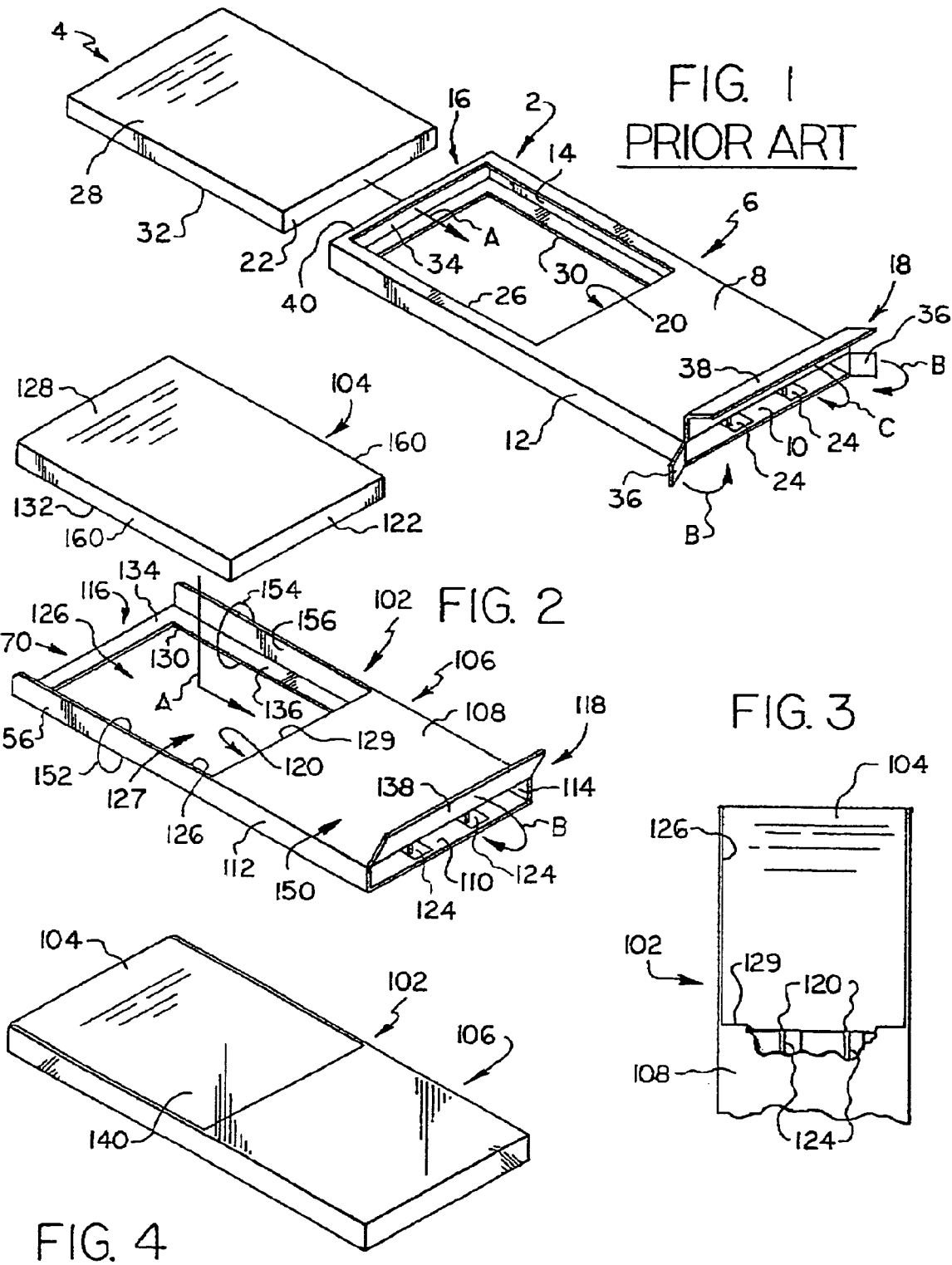

LONG BOX PACKAGING DESIGN FOR PRERECORDED MEDIA

BACKGROUND OF THE INVENTION

1. Field of the Invention

The present invention relates to the field of packaging, and more particularly to the packaging of prerecorded media such as Digital Versatile Disks (DVDs) and Compact Disks (CDs). Still more particularly, the invention concerns an improved long box packaging design.

2. Description of Prior Art

By way of background, the so-called "long box" is a popular form of packaging for the retail display and sale of prerecorded media, particularly video DVDs and audio CDs. This type of package, which is made of preprinted cardboard, is used to carry a plastic or cardboard media case that itself contains one or more disk media storing the prerecorded content. The media case is disposed within the package and is viewable through a pair of windows respectively formed in the package's front and rear walls. A transparent wrapper (such as "shrink wrap") covers and seals the entire package. The name "long box" derives from the fact that the package is substantially longer than the media case that it carries. This provides a security feature insofar as the substantial length of the package makes it somewhat difficult for a would-be thief to conceal. The additional package length also provides more area for preprinted graphics and other marketing content, thereby enhancing the visual presentation of the product.

A disadvantage of the conventional long box design is that assembly of the package, and particularly the insertion of the prerecorded media product into the assembled package, is somewhat awkward and time consuming. The principal difficulty lies in the fact that the media case needs to be inserted through a narrow four-sided slot at the media-carrying end of the box. This insertion operation is performed manually or using an automated system. The slot is sized to substantially match the cross-sectional profile of the media case, which means that the media case must be nearly perfectly aligned with the slot in order to be properly inserted therein without the box being bent, ripped or otherwise mutilated. Package assembly is also complicated by the fact that the non-media end of the box is closed by way of a pair of folding side flaps and a main tuck flap, each of which requires manipulation according to a fold and tuck closure operation. A further disadvantage of the conventional long box design is that the front window tends to cover a top portion of the media case. For DVD videos, this portion of the media case is typically used to present media format information, namely, whether the DVD is recorded in a "Widescreen" format or a "Fullscreen" format. Because the long box package covers this information, the information must be placed or printed on the long box package itself, thus requiring either the production of two package versions for each production title released in the two formats, or the use of adhesive labels that indicate the format and which must be separately applied to each package.

It is to improvements in the design of long box packaging for prerecorded media that the present invention is directed. What is required is a long box design that allows rapid and more efficient insertion of the media case, which is simpler to close at the non-media end of the box, which is easier to manufacture, and which maximizes the viewable area of the media case.

SUMMARY OF THE INVENTION

The foregoing problems are solved and an advance in the art is achieved by an improved package, and more particularly an improved long box package for prerecorded media. The improved package includes an elongated substantially rectangular box enclosure having a front wall, a rear wall, and a pair of first and second side walls. The box enclosure further includes an open top end, a bottom end adapted to be closed, and an interior shelf disposed between the top end and the bottom end for supporting the bottom end of a media case to be carried by the package. The front wall is formed with an opening that is contiguous with the open top end and which extends toward the shelf. In combination, the open top end and the contiguous front wall opening define an open channel for receiving the media case. The open channel facilitates rapid placement of the media case in the package by virtue of the media case not being restricted to insertion through the top end only. The front wall opening can be of any desired length and width, but preferably extends longitudinally to a location that is proximate to the shelf, and laterally from the first side wall to the second side wall. This configuration provides a substantially unhindered view of the front face of the media case without significant obstruction thereof by any package component. This configuration also relies to a greater extent on the transparent wrapper, or shrink-wrap, to secure the media case within the long box package.

The rear wall can be formed with a rear window for viewing the rear face of the media case. The rear window is framed by peripheral portions of the rear wall that provide support for the rear face of the media case. The peripheral portions of the rear wall may include a lateral support member adjacent to the open top end, together with a pair of longitudinal support rails respectively adjacent to the first and second side walls. In a modified version of the rear window, the lateral support member could be eliminated (leaving the media case supported primarily by the longitudinal support rails) so that the rear window is contiguous with the open top end, thereby enlarging the viewable area of the rear face of the media case. The shelf portion of the box enclosure can be constructed so as to comprise one or more box spacer members disposed within the box enclosure to maintain separation of the front wall and the rear wall. The bottom end of the box enclosure can be constructed with a single closure flap hinged to one of the front wall or the rear wall, thereby eliminating the standard tuck and fold design and further reducing the effort required to assemble the package.

The present invention may be viewed in an alternative light as a long box package that includes a base enclosure having a front wall, a rear wall, a pair of first and second side walls, a first end that is adapted to be closed, and a second end that comprises a shelf for supporting the bottom end of a media case to be carried by the package. A pair of media case carrying arms extend from the shelf end of the base enclosure and define an open channel having an open top end and a contiguous front opening for receiving the media case. The arms can be substantially L-shaped, with each arm comprising a rear rail adapted to support a rear face of the media case and a side rail adapted to support a side wall of the media case. A lateral support member may extend between the rear rails adjacent to the ends of the arms to provide further support for the rear face of the media case. Alternatively, the lateral support member could be eliminated.

The present invention may be viewed in a further alternative light as a long box package that includes a base enclosure having a front wall, a rear wall, a pair of first and second side walls, a first end that is closed, and a second end that comprises a shelf for supporting the bottom end of a media case to be carried by the package. Means extending from the shelf end of the base enclosure are provided for defining an open channel having an open top end and a contiguous front opening for receiving and carrying the media case.

The present invention also contemplates a long box package, per the above, in combination with a media case containing a prerecorded medium, and a transparent wrapping on the package.

BRIEF DESCRIPTION OF THE DRAWINGS

The foregoing and other features and advantages of the invention will be apparent from the following more particular description of an exemplary embodiment of the invention, as illustrated in the accompanying Drawings in which:

FIG. 1 is a perspective view showing a long box package according to a prior art design receiving a media case containing a prerecorded disk medium;

FIG. 2 is a perspective view showing an improved long box package according to the present invention receiving a media case containing a prerecorded disk medium;

FIG. 3 is a fragmentary plan view showing a media-carrying portion of the long box package of FIG. 2, with the media case supported therein; and FIG. 4 is a perspective view of the long box package of FIG. 2 with the media case supported therein and with the package covered and sealed by a transparent wrapper.

DETAILED DESCRIPTION OF EXEMPLARY EMBODIMENT

Before describing an exemplary embodiment of the invention, it will be helpful to first review the construction details of a typical prior art long box design in order to better illustrate the deficiencies thereof that are addressed by the present invention. In FIG. 1, a prior art long box package 2 is shown in combination with a media case 4 that contains a prerecorded disk medium (not shown), such as one or more video DVDs or audio CDs. The media case 4 has the usual rectangular configuration in which the side wall dimension is relatively thin compared to the front and rear face length and width dimensions of the case, resulting in a shallow low profile appearance. The package 2 comprises an elongated substantially rectangular box enclosure 6 having a front wall 8, a rear wall 10, and a pair of first and second side walls 12 and 14. The box enclosure 6 further includes an open top end 16, a bottom end 18 that is adapted to be closed, and a recessed interior shelf 20 disposed between the top end and the bottom end for supporting a bottom end 22 of the media case 4. Although not explicitly shown in FIG. 1, the shelf 20 is provided by the top ends of two longitudinally extending box spacer members 24 disposed within the box enclosure 6 to maintain separation of the front wall 8 and the rear wall 10. A framed front window 26 is formed in the front wall 8 to facilitate viewing of a front face 28 of the media case 4. A matching framed rear window 30 is formed in the rear wall 10 to facilitate viewing of a rear face 32 of the media case 4. As can be seen in FIG. 1, this area of the box enclosure 6 (extending between the shelf 20 and the open top end 16) constitutes a media compartment that substantially conforms to the dimensions of the media case 4, and therefore matches its low profile configuration.

As discussed by way of background above, the only way to insert the media case 4 into the package 2 is through a narrow four-sided slot 34 defined at the top end 16 of the box enclosure 6. This insertion operation is either performed manually or using an automated system. The arrow labeled "A" in FIG. 1 illustrates the required direction of movement of the media case 4 in order to effect its insertion into the slot 34. The slot 34 is sized to substantially match the cross-sectional profile of the media case 4, which means that the media case must be nearly perfectly aligned with the slot in order to be properly inserted therein without the box enclosure 6 being bent, ripped or otherwise mutilated.

Package assembly is also complicated by the fact that the bottom end 18 of the box enclosure 6 is closed by way of a pair of folding side flaps 36 and a main tuck flap 38. Each of these flaps requires manipulation according to a fold and tuck closure operation in which the side flaps 36 are first folded in the direction of the arrows labeled "B," following which the main flap 38 is folded in the direction of the arrow labeled "C" and tucked inside the box enclosure 6.

An additional disadvantage of the package 2 is that the front face 28 of the media case 4 is obstructed at its top end by a lateral member 40 situated at the top end of the front wall 8. The lateral member 40 represents part of the frame or border of the front window 26 (and also defines one of the four sides of the slot 34). For video DVDs, the area of the media case 4 that is obstructed by the lateral member 40 is typically labeled to distinguish between "Widescreen" and "Fullscreen" versions of the same title. This has necessitated that either two versions of the package 2 be produced with alternative formatting indicia thereon, or that adhesive labels that identify the format be placed on the packaging, so that customers can easily distinguish between such versions.

Turning now to the remaining drawing figures wherein like reference numerals indicate like elements in all of the several views, FIG. 2 illustrates an improved long box package 102 in combination with a media case 104 that contains a prerecorded disk medium (not shown), such as one or more video DVDs or audio CDs. As in FIG. 1, the media case 104 has the usual rectangular configuration in which the side wall dimension is relatively thin compared to the front and rear face length and width dimensions of the case, resulting in a shallow low profile appearance. The package 102 includes an elongated substantially rectangular box enclosure 106 having a front wall 108, a rear wall 110, and a pair of first and second side walls 112 and 114. The box enclosure 106 further includes an open top end 116 that is free of flaps or other closure elements, a bottom end 118 that is adapted to be closed, and a recessed interior shelf 120 disposed between the top end and the bottom end for supporting the bottom end 122 of the media case 104. With additional reference now to FIG. 3, the shelf 120 is provided by the top ends of two longitudinally extending box spacer members 124 disposed within the box enclosure 106 to maintain separation of the front wall 108 and the rear wall 110. As can be seen in FIG. 2, the area of the box enclosure 106 that extends between the shelf 120 and the open top end 116 constitutes a media compartment that substantially conforms to the dimensions of the media case 104, and therefore matches its low profile configuration. It will be appreciated that other media compartment configurations could be provided for media cases of different shape.

An opening 126 is formed in the front wall 108 that is contiguous with the open top end 116 and which extends toward the shelf 120. In combination, the open top end 116 and the contiguous opening 126 define an open U-shaped channel 127 for receiving the media case 104. As can be seen in FIG. 2, the channel 127 is bounded by portions of the side walls 112/114 and the rear wall 110 that are present in this region of the box enclosure 106. The opening 126 is sized so as to extend longitudinally to a location that is proximate to the shelf 120, and laterally from the first side wall 112 to the second side wall 114. As shown in FIG. 3, this configuration provides a substantially unhindered view of the front face 128 of the media case 104. This configuration also relies to a greater extent on a transparent (e.g., shrink wrap) wrapping 140 (discussed below in connection with FIG. 4) to secure the media case 104 in the box enclosure 106. The only obstruction of the media case front face 128 occurs as a result of the shelf 120 being recessed from the bottom end of the opening 126, thereby forming a small lip 129 where the front wall 108 extends beyond the shelf. The lip 129 covers a small bottom portion of the media case's front face 128.

The open channel 127 provided by the opening 126 lends itself to rapid placement of the media case 104 in the package 102 by virtue of the media case not being restricted to insertion through the enclosed top end slot 34, as in the prior art package 2. Instead, the media case 104 may be conveniently inserted via the front of the box enclosure 106 by maneuvering the media case until it contacts elements of the rear wall 110, then displacing the media case a short distance to seat its bottom end 122 underneath the lip 129 and in engagement with the shelf 120. This motion is exemplified by the arrow labeled "A" in FIG. 2.

It will be appreciated that the configuration of the opening 126 could be modified in several respects, according to design preferences. For example, the opening 126 could be sized so that it extends completely to the ledge 120, thereby eliminating the lip 129 and providing a completely unobstructed view of the media case front face 128. However, the media case 104 would not be as well supported in the package 102 insofar as the lip 129 would not be available to recess the ledge 120 and trap the bottom end 122 of the media case. In another alternative configuration, the opening 126 could be sized so that it does not extend completely between the side walls 112 and 114. The media case 104 would then need to be inserted through the top end 116 due to the presence of residual portions of the front wall 108. However, the insertion would not be as restrictive as in the prior art package 2 of FIG. 1 because there is no lateral member 40 to create the enclosed slot 34.

The rear wall 110 is provided with a framed rear window 130 for viewing the rear face 132 of the media case 104. The rear window 130 is framed by peripheral portions of the rear wall 110 that provide support for the rear face 132 of the media case 104. These peripheral portions include a first lateral support member 134 adjacent to the open top end 116, a second lateral support member (not shown) adjacent to the shelf 120 and matching the configuration of the lip 129, and a pair of longitudinal support rails 136 respectively adjacent to the first and second side walls 112 and 114. In a modified version of the rear window 130, the lateral support member 134 could be eliminated to provide increased visibility of the rear face 132 of the media case 104. For this modified rear window configuration, the box enclosure 106 would support the media case 104 primarily by way of the longitudinal support rails 136, with some additional support being provided by the lip 129 and its counterpart on the rear wall 110 of the box enclosure.

Closure of the bottom end 118 of the box enclosure 106 can be conveniently performed by providing a single flap 138 that is hinged to the front wall 108 and sized to completely cover the bottom end, thereby eliminating the tuck and fold operation associated with the package 2 and further reducing the assembly effort. Instead, the flap 138 is simply folded in the direction of the arrow labeled "B" in FIG. 2. It will be appreciated that the flap 138 could also be hinged to the rear wall 110. Following closure of the flap 138 and insertion of the media case 104 in the open channel 127, a completed package assembly can be formed as shown in FIG. 4 by covering and sealing the box enclosure 106 and the media case 104 with a transparent wrapping 140, such as a shrink wrap cover. In this configuration, the package 102 is ready for retail display. The wrapping 140 is tightly wrapped around the box enclosure 106 and serves to secure the media case 104 therein until such time as a customer purchases the product and removes the wrapping to access the media contents.

Having now described the various features of the improved package 102, it may be helpful to review the package's construction from a slightly different perspective in order to more clearly illustrate some of the salient aspects of the present invention. In particular, the invention may be viewed in an alternative light as a long box package 102 that includes a substantially rectangular base enclosure 150 (see FIG. 2) defined by a bottom portion of the front wall 108, a bottom portion of the rear wall 110, and bottom portions of the first and second side walls 112 and 114. The base enclosure 150 is further defined by the bottom end 118 and a second end that comprises the shelf 120. Extending from the shelf end of the base enclosure 150 are a pair of media case carrying arms 152 and 154. The arms 152 and 154 define the open channel 127 that comprises the open top end 116 and the contiguous front opening 126 for receiving the media case 104. The arms 152 and 154 are substantially L-shaped. Each arm comprises one of the longitudinal (rear) rails 136 adapted to support the rear face 132 of the media case 104, and a side rail 156 (representing a top portion of one of the side walls 112/114) adapted to support the side walls 160 of the media case. The lateral support member 134 extends between the rear rails 136 adjacent to the ends of the L-shaped arms 152 and 154 (or it could be eliminated as described above).

The present invention may be viewed in a further alternative light as a long box package that includes a substantially rectangular base enclosure 150 defined by a bottom portion of the front wall 108, a bottom portion of the rear wall 110, bottom portions of the first and second side walls 112 and 114, the bottom end 118, and a second end that comprises the shelf 120. Extending from the shelf end of the base enclosure 150 are means 170 for defining the open channel 127 comprising the open top end 116 and the contiguous front opening 126 for receiving and carrying the media case.

Accordingly, an improved long box packaging design for prerecorded media has been disclosed. Although an exemplary embodiment of the invention has been shown and described, the description and the drawings herein are merely illustrative, and it will be apparent that various modifications, combinations and changes can be made in accordance with the invention. As such, the invention is not to be in any way limited except in accordance with the spirit of the appended claims and their equivalents.

What is claimed is:

1. A packaging article, comprising:
    an elongated substantially rectangular box enclosure having a front wall, a rear wall, and a pair of first and second side walls;
    said box enclosure further having an open top end, a bottom end adapted to be closed, and an interior shelf disposed between said top end and said bottom end for supporting the bottom end of a media case to be carried by said package;
    an opening in said front wall contiguous with said open top end and extending toward said shelf to define an open channel for receiving said media case;
    said front wall opening extending laterally from said first side wall to said second side wall such that said channel is U-shaped and defined laterally by said first and second side walls;
    said first and second side walls being substantially planar and defining outside walls of said box enclosure; and whereby said open channel facilitates rapid placement of said media case in said package by virtue of said media case not being restricted to insertion through said top end only.

2. An article according to claim 1, wherein said front wall opening terminates proximate to said shelf.

3. An article according to claim 1, wherein said rear wall has a rear window for viewing a rear face of said media case.

4. An article according to claim 3, wherein said rear window is framed by peripheral portions of said rear wall, said peripheral portions of said rear wall providing support for said rear face of said media case.

5. An article according to claim 4, wherein said peripheral portions of said rear wall include a lateral support member adjacent to said open top end.

6. An article according to claim 4, wherein said peripheral portions of said rear wall include a pair of longitudinal support rails respectively adjacent to said first and second side walls.

7. An article according to claim 1, wherein said shelf comprises one or more box spacer members disposed in said box enclosure to maintain separation of said front wall and said rear wall.

8. An article according to claim 1, wherein said closed end comprises a single flap hinged to one of said front wall or said rear wall.

9. A packaging article, comprising:
a base enclosure having a front wall, a rear wall, a pair of first and second side walls, a first end that is adapted to be closed, and a second end that comprises a shelf for supporting the bottom end of a media case to be carried by said package;
a pair of media case carrying arms extending from said shelf end of said base enclosure and defining an open channel having an open top end and a contiguous open front face for receiving said media case;
said arms being substantially L-shaped, with one planar leg of each arm being formed as an extension of a respective one of said first and second side walls; and
whereby said open channel facilitates rapid placement of said media case in said package by virtue of said media case not being restricted to insertion through said top end only.

10. An article according to claim 9, wherein said arms each comprise a rear rail adapted to support a rear face of said media case, and a side rail adapted to support a side wall of said media case.

11. An article according to claim 10, further including a lateral support member extending between said rear rails adjacent to the ends of said arms, said lateral support member being adapted to provide further support for said rear face of said media case.

12. An article according to claim 9, wherein said shelf comprises one or more box spacer members disposed in said box enclosure to maintain separation of said front wall and said rear wall.

13. An article according to claim 9, wherein said closed end comprises a single flap hinged to one of said front wall or said rear wall.

14. A packaging article, comprising:
a base enclosure having a front wall, a rear wall, a pair of first and second side walls, a first end that is adapted to be closed, and a second end that comprises a shelf for supporting the bottom end of a media case to be carried by said package;
means extending from said shelf end of said base enclosure for defining an open channel having an open top end and a contiguous open front face for receiving and carrying said media case;
said means for defining an open channel comprising a pair of substantially L-shaped media case carrying arms, with one planar leg of each arm being formed as an extension of a respective one of said first and second side walls; and
whereby said open channel facilitates rapid placement of said media case in said package by virtue of said media case not being restricted to insertion through said top end only.

15. An article according to claim 1 in combination with a media case containing a prerecorded medium and a transparent wrapping on said package, whereby said media case is secured in said box enclosure by said transparent wrapping.

16. An article according to claim 9 in combination with a media case containing a prerecorded medium and a transparent wrapping on said package, whereby said media case is secured in said box enclosure by said transparent wrapping.

17. An article according to claim 14 in combination with a media case containing a prerecorded medium and a transparent wrapping on said package, whereby said media case is secured in said box enclosure by said transparent wrapping.

18. A prerecorded media package, comprising:
an elongated substantially rectangular box enclosure having a front wall, a rear wall, and a pair of first and second side walls;
said box enclosure further having an open top end that is free of closure elements, a closed bottom end, and an interior shelf disposed between said top end and said bottom end for supporting the bottom end of a media case to be carried by said package;
a media compartment in said box enclosure extending from said interior shelf to said top end;
a media case in said media compartment, said media case containing one or more prerecorded media and having a rectangular configuration rectangular configuration in which a side wall dimension of said media case is relatively thin compared to front and rear face length and width dimensions of said media case, resulting in a shallow low profile configuration;
said media compartment substantially conforming to said dimensions of said media case and therefore matching said media case low profile configuration;
an opening in said front wall contiguous with said open top end and extending toward said shelf to define an open channel for receiving said media case;
said front wall opening extending laterally from said first side wall to said second side wall such that said channel is U-shaped and defined laterally by said first and second side walls, and terminating proximate to said shelf for substantially unhindered viewing of a front face of said media case;
said first and second side walls being substantially planar and defining outside walls of said box enclosure;
a rear window in said rear wall for viewing a rear face of said media case;
a transparent wrapping surrounding said box enclosure; and
whereby said open channel facilitates rapid placement of said media case in said package by virtue of said media case not being restricted to insertion through said top end only.

* * * * *